US012609520B2

(12) United States Patent
Harvey et al.

(10) Patent No.: US 12,609,520 B2
(45) Date of Patent: Apr. 21, 2026

(54) FLEXIBLE ELEMENT TENSIONING MECHANISM

(71) Applicant: PassiveLogic, Inc., Holladay, UT (US)

(72) Inventors: Troy Aaron Harvey, Brighton, UT (US); Alexa Kalandiak, Salt Lake City, UT (US); Bryan Bourgeois, Underhill, VT (US)

(73) Assignee: PassiveLogic, Inc., Holladay, UT (US)

( * ) Notice: Subject to any disclaimer, the term of this patent is extended or adjusted under 35 U.S.C. 154(b) by 196 days.

(21) Appl. No.: 18/499,349

(22) Filed: Nov. 1, 2023

(65) Prior Publication Data

US 2025/0141201 A1 May 1, 2025

(51) Int. Cl.
| | |
|---|---|
| *G06F 1/16* | (2006.01) |
| *B65H 75/36* | (2006.01) |
| *H02G 11/00* | (2006.01) |
| *H05K 5/00* | (2025.01) |
| *H05K 7/00* | (2006.01) |

(52) U.S. Cl.
CPC ......... *H02G 11/003* (2013.01); *B65H 75/368* (2013.01); *B65H 2701/36* (2013.01)

(58) Field of Classification Search
CPC ... H02G 11/003; B65H 75/368; G06F 1/1632; G06F 1/1654
See application file for complete search history.

(56) References Cited

U.S. PATENT DOCUMENTS

| | | | | |
|---|---|---|---|---|
| 6,062,148 A | * | 5/2000 | Hodge | A47B 9/12 |
| | | | | 108/147 |
| 11,771,220 B1 | * | 10/2023 | Brooks | A47B 51/00 |
| | | | | 312/319.7 |
| 2011/0051380 A1 | * | 3/2011 | Park | H04M 1/0237 |
| | | | | 361/749 |
| 2012/0119040 A1 | * | 5/2012 | Ergun | F16M 11/046 |
| | | | | 248/274.1 |
| 2013/0201625 A1 | * | 8/2013 | Liang | G06F 1/1624 |
| | | | | 361/679.55 |
| 2013/0256489 A1 | * | 10/2013 | Ergun | F16M 13/02 |
| | | | | 248/297.11 |
| 2014/0085792 A1 | * | 3/2014 | Lu | G06F 1/1624 |
| | | | | 361/679.08 |

(Continued)

OTHER PUBLICATIONS

International Search Report for PCT/US2024/053294, Jan. 10, 2025.

(Continued)

*Primary Examiner* — Anthony M Haughton

(57) ABSTRACT

Various embodiments relate to an apparatus for flexible element management including a first element; a second element, wherein the second element is movable relative to the first element; a flexible element extending between the first element and the second element; and a tensioning element in contact with the flexible element. Various embodiments disclose an apparatus for flexible element management that may be incorporated in sliding, hinging, and various other movement patterns. Various embodiments disclose an apparatus for management of electrical wiring between two elements, which may include, but are not limited to, a display screen and a housing for electrical components, a memory compartment and a computer, and a power supply and a computer.

16 Claims, 9 Drawing Sheets

100

(56) References Cited

U.S. PATENT DOCUMENTS

| | | | | |
|---|---|---|---|---|
| 2015/0185783 A1* | 7/2015 | Hui | ...................... | G06F 1/1624 |
| | | | | 361/679.29 |
| 2019/0226630 A1* | 7/2019 | Chen | ................. | F16M 11/2014 |
| 2020/0249726 A1* | 8/2020 | Brocklesby | .......... | H02G 11/003 |
| 2021/0034098 A1* | 2/2021 | Kang | .................... | G06F 1/1601 |
| 2022/0066722 A1* | 3/2022 | Harvey | ................... | F24F 11/63 |
| 2022/0413564 A1* | 12/2022 | Huang | ................. | G06F 1/1683 |

OTHER PUBLICATIONS

Written opinion of the International Searching Authority for PCT/US2024/053294, Jan. 10, 2025.

* cited by examiner

100

100

300

320

520

FLEXIBLE ELEMENT TENSIONING MECHANISM

TECHNICAL FIELD

Various embodiments described herein relate to computer cable or other flexible element management, and more particularly, but not exclusively, to using tensioning mechanisms to manage cable length between elements.

BACKGROUND

Modern computing devices often have integrated displays with at least one degree of freedom of movement from the graphics chip. In turn, this movement utilizes some type of cable to deliver a signal from the graphics chip to the display. In some cases, the cable is not within a case and is clunky, in the way, or visible to the user. Other designs attempt to hide a low profile cable in the device case. For example, in a notebook computer, a ribbon cable may be hidden in the hinge. In most cases, there is at least one relatively fixed point of articulation between to two sub-components to pass the cable through so that no damage occurs to the cable during movement. However, other forms of movement are possible, such as a sliding screen that moves up and down relative to the device body or an entirely detachable screen, where such a fixed point is not present. In this case, the distance between the two endpoints of the cable will change between screen positions. Accordingly, cable management for these systems may not be as straight-forward as devices with a fixed point of articulation.

SUMMARY

According to various embodiments described herein, a flexible element management apparatus is disclosed, including one or more of the following: a first element; a second element, wherein the second element is movable relative to the first element; a flexible element extending between the first element and the second element; and a tensioning element in contact with the flexible element, whereby: movement of the second element relative to the first element results in movement of at least one endpoint of the flexible element, and tension is maintained on the flexible element.

Various embodiments are described wherein tension is maintained on the flexible element during movement.

Various embodiments are described wherein the first element comprises a display screen and wherein the second element comprises components that enable functioning of the display screen.

Various embodiments are described wherein the tensioning element comprises a spring.

Various embodiments are described wherein the tensioning element is housed within the second element.

Various embodiments are described wherein the flexible element provides an electrical connection between the first element and the second element.

Various embodiments are described wherein the flexible element communicates information via the electrical connection between the first element and the second element.

Various embodiments are described wherein the first element is slidable relative to the second element.

Various embodiments are described wherein the first element is slidable relative to the second element in a plane parallel to a planar face of the second element.

Various embodiments relate to a computer cable management apparatus, including one or more off the following: a first element; a second element, wherein the second element is movable relative to the first element; a computer cable extending between the first element and the second element; and a means for applying a tension to the computer cable throughout movement of the second element relative to the first element, whereby: movement of the second element relative to the first element results in movement of at least one endpoint of the computer cable, and tension is maintained on the computer cable.

Various embodiments are described wherein the computer cable is a ribbon cable.

Various embodiments are described wherein a computer cable management apparatus is disclosed, including a first element; a second element, wherein the second element is movable relative to the first element; a computer cable extending between the first element and the second element; a tensioning element; and a contact point between the tensioning element and the computer cable, whereby: movement of the second element relative to the first element results in movement of at least one endpoint of the computer cable, and tension is maintained on the cable.

Various embodiments are described further comprising a second tensioning element.

Various embodiments are described further comprising a second contact point between the tensioning element and the computer cable.

BRIEF DESCRIPTION OF THE FIGURES

Non-limiting and non-exhaustive embodiments of the present embodiments are described with reference to the following drawings, wherein like reference numerals refer to like parts throughout the various views unless otherwise specified. In order to better understand various example embodiments, reference is made to the accompanying drawings, wherein.

DETAILED DESCRIPTION

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

The technical character of embodiments described herein will be apparent to one of ordinary skill in the art, and will also be apparent in several ways to a wide range of attentive readers. Some embodiments address mechanical concepts, such as tensioning cables to provide for more adequate positioning of cable around a system to effectively manage cable slack. This may allow for longevity of the cables through better spacing and placement. Other advantages based on the technical characteristics of the teachings will also be apparent from the description provided.

The current methods of cable management largely revolve around leaving enough slack in the cable length to allow movement of sliding devices. However, the disadvantages posed by these methods are that excess cable material is often used, as well as crowding of the internal components of computers with cables hanging freely in computer compartments. Should these cables extend outside of their compartments, they are susceptible to crimping and damage during the movement of a sliding screen or other movement patterns with no fixed point of articulation.

The various embodiments presented are viable solutions to the problems enumerated in the prior paragraph. These embodiments may allow for cable management during sliding, hinging, or other movement patterns, preventing damage to the cables while effectively organizing the cable to maximize available space within computer compartments. Various advantages associated with compartmentalizing computer components using various embodiments will be clear to one of skill in the art.

Figure 1A:
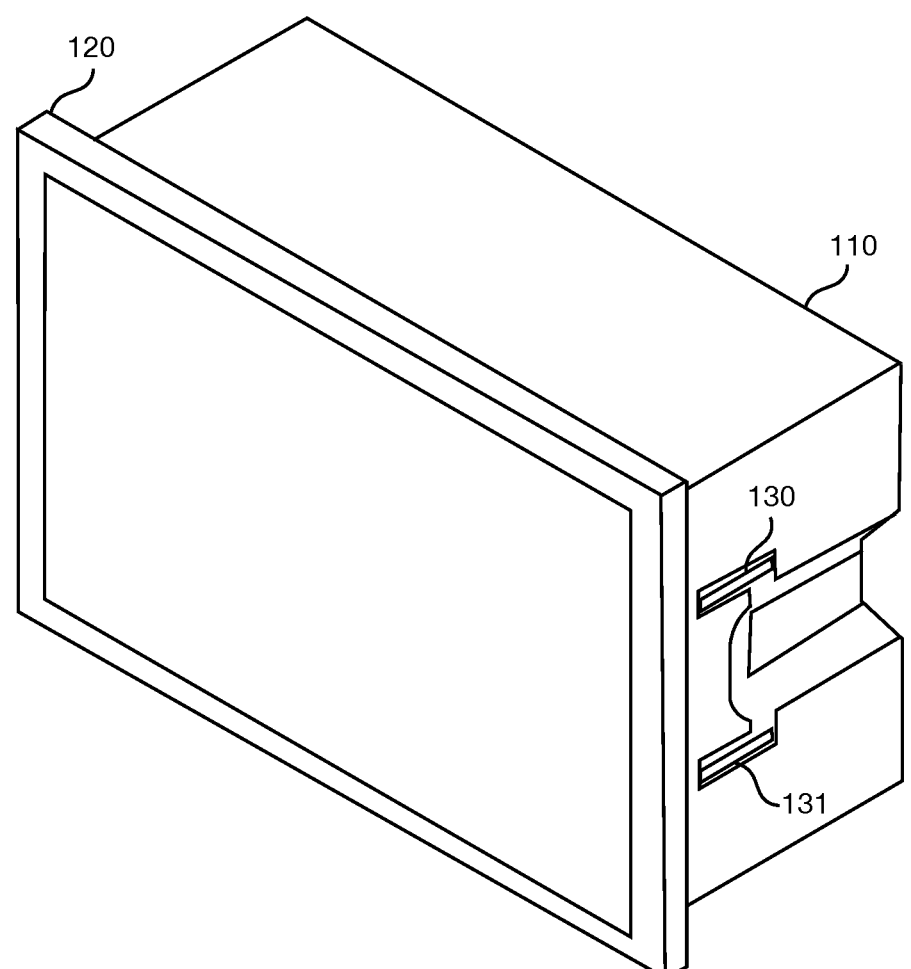
FIG. 1A illustrates a first state of an example environment for flexible element management, including a sliding display screen in a closed position.

FIG. 1A illustrates a first state of an example environment 100 in which flexible element management may be implemented. As shown, environment 100 may be a digital controller device having a display screen 120 that is slidable relative to a controller housing 110. The screen 120 may slide on a set of rails (not shown), but may also utilize any other mechanism suitable for allowing sliding movement. Furthermore, the screen 120 may be slidable in other directions, such as to the left or to the right of the controller housing 110, or movable in another, non-slidable manner (e.g. on a hinge, cord, or other mechanism). The controller housing 110 and screen 120 are merely example components, and these components may be any two different elements. Some other examples include a memory compartment and a computer, a power supply and a computer, or an electrical outlet housing and an outlet face.

In environment 100, the digital controller may have mounting mechanisms 130, 131, as well as additional mounting mechanisms (not shown). The example environment 100 may include such a mechanism for mounting the environment to a structure such as a wall. The mounting mechanisms 130, 131 are depicted as a system with a screw mechanism, controlling components comparable to toggle bolts, inside the controller housing 110, but other mechanisms, such as standard screws, adhesive strips or putty, or a support shelf inside a wall cavity or other surface with an interior cavity, may be used. In the illustrated embodiment, the mounting mechanisms 130, 131 may expand sideways so as to form a flat surface to attach to an interior surface of a wall. Such an arrangement (or various alternative arrangements) may enable the controller housing 110 to be installed at least partially within the wall, leaving the screen 120 flush with the surface of the wall or extending outward from the wall surface by only a short depth relative to the full depth of the environment 100. As shown in FIG. 1A, the screen 120 is currently in a closed position wherein the screen encloses an interior of the housing 110.

Figure 1B:
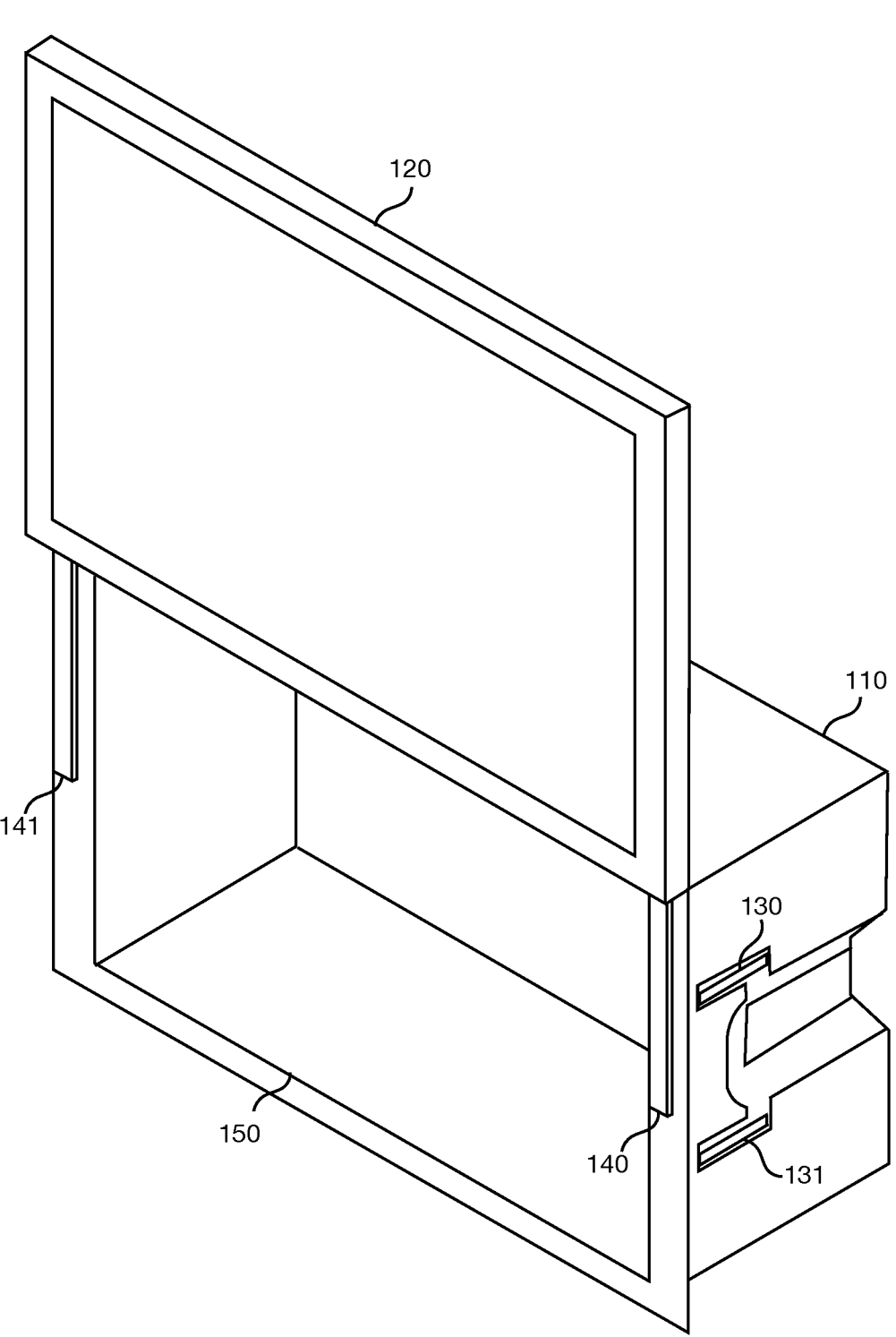
FIG. 1B illustrates a second state of an example environment for flexible element management, including a sliding display screen in an open position.

FIG. 1B illustrates a second state of an example environment 100 in which flexible element management may be implemented. As shown, in this style, the screen 120 is currently in an open position as the screen has slid upward compared to the first state, exposing the interior of the housing 110. The controller device may have a sliding rail 140 and a second sliding rail 141 as shown in FIG. 1B, allowing for movement of the screen 120 vertically in the sample environment 100. Other mechanisms besides rails may be used, including, but not limited to, hinges or detachable magnets. The movement of the screen 120 to an open position reveals an internal compartment 150 of the controller housing 110.

In various embodiments where the controller housing 110 has been installed in a wall via mounting mechanisms 130, 131, and other mounting mechanisms (not shown), and the rear surface of the screen 120 is flush with the outer surface of the wall, the internal compartment 150 may thus be disposed, at least partially in the wall interior. The compartment may allow for access to hardware for the screen 120 or other components. The screen 120 being slidable allows for access to the internal compartment 150 in such a setup. For example, a processor (such as a CPU or GPU) may reside in the controller housing 110, and a cable may be used to transmit information between the screen 120 and the processor. Other examples may include memory storage space in the internal compartment 150 for a computer, a power source for the screen 120, or components for a touchscreen interface for the screen 120. Virtually any environment where two elements are mountable yet tethered for any reason may benefit from the teachings herein. The screen 120 may also be slidable for other purposes, such as being slidable for adjustments to height for user comfort. Furthermore, screen 120 may be a different element, such as an electrical outlet, wherein the outlet is moveable in order to position the outlet around obstacles, such as furniture.

Figure 2A:
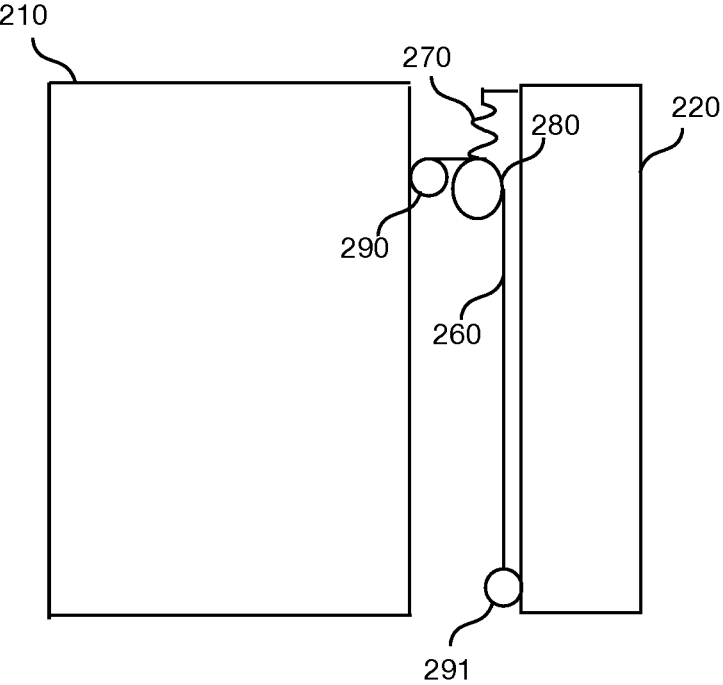
FIG. 2A illustrates a diagram of an example embodiment, including a sliding display screen in a closed position.

FIG. 2A illustrates a diagram of an example embodiment in a starting state which may correspond to the closed state of FIG. 1A. A first element 220, which may correspond to the screen 120, is movable relative to a second element 210, which may correspond to the housing 110. In this illustration, the second element 210 is slidable relative to the first element 220, but a number of other movement patterns, including, but not limited to, hinging, detachment, and rotation, may be present in various embodiments. A flexible element 260 extends between the first element 220 and the second element 210. The flexible element 260 may be a cable that provides an electrical connection between the first element 220 and the second element 210, including, but not limited to a power connection or information connection. The flexible element 260 may be a ribbon cable that communicates information via an electrical connection between the first element 220 and the second element 210. In other embodiments, the flexible element 260 may be a different variety of computer cable, or any other flexible cable string, rope, chain, tether, or other flexible element, used for a purpose of connecting the first element 220 with the second element 210. The flexible element 260 is directly or indirectly connected to a tensioning element 270, which may be a spring, an elastic band, or other means for tensioning, at a contact point 280. The contact point 280 may be a direct contact, for instance where the tensioning element 270 is itself also the contact point 280, such as a weighted tensioning rod. The contact point 280 may also be a medium between the tensioning element 270 and the flexible element 260, such as a crossbar, through which the tensioning element 270 interacts with the flexible element 260. For example, the tensioning element 270 may be a spring, the connection point 280 may be a crossbar, and the flexible element 260 may be a cable. In this scenario, the spring would attach to the crossbar, imparting a force on the crossbar. The cable would be wrapped around the crossbar, traveling around the crossbar during movement of the first element 220 relative to the second element 210, and thus the crossbar would impart an upward force on the cable. In various embodiments, multiple tensioning elements 270 or contact points 280 may be present. In any event, the tensioning element 270 imparts a directional force on at least a point of the flexible element 260. As shown in FIG. 2A, the current direction of the force is upward, but the force may be in other directions.

The flexible element 260 maintains two endpoints: a first connection point 291 with the first element 220 and a second connection point 290 with the second element 210. These connection points 290, 291 may be the true connection of the flexible element 260 to the first element 220 and the second element 210, such as a cable connecting to pins, but may also be an area where the flexible element is cinched, as opposed to its true connection. In such a case, the flexible element 260 may further extend into either element, and in turn, the position of the portion of the flexible element extending between the two elements may be the portion of the flexible element 260 that is affected by the force from the tensioning element 270 and contact point 280. In various embodiments, the connection points 290, 291 may be viewed as the mechanical endpoint of the ribbon cable 260 for the purposes of the teachings herein.

Figure 2B:
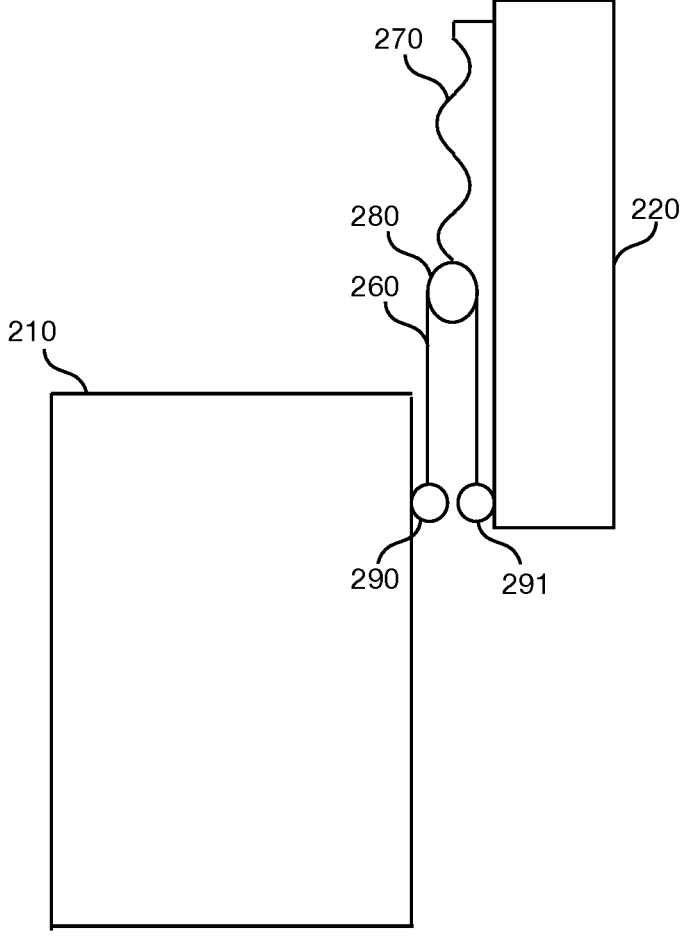
FIG. 2B illustrates a diagram of an example embodiment, including a sliding display screen in an open position.

FIG. 2B illustrates a diagram of an example embodiment in a second state which may correspond to the open state of FIG. 1B. In this diagram, the first element 220 is moveable upward relative to the second element 210. As the first element 220 is moved upward relative to the second element 210, the flexible element 260 is moved as well so that the length of the flexible element 260 on either side of the contact point 280 has changed. As discussed in paragraph 35, the contact point 280 may be a direct contact or a medium through which the tensioning element 270 interacts with the flexible element 260. As shown in FIG. 2B in comparison to FIG. 2A, the contact point 280 has moved upward relative to the second element 210 and downward relative to the first element 220, and a proportion of the flexible element 260 to the right of the contact point 280 is now positioned on the left side of the contact point 280. The tensioning element 270 maintains contact with the contact point 280, and a specific spot of the flexible element 260 may roll around, or otherwise move past, the contact point 280 as the contact point 280 moves. As such, the contact point 280 may move to a different position along the length of the flexible element 260. In various embodiments, multiple contact points 280 may exist that move together or independently of one another. As depicted in this example, the flexible element 260 is doubled over for a length appropriate for there to be little to no slack. The positions in FIGS. 2A and 2B are non-exhaustive, as the two elements may be in any position between a fully open position and a fully closed position. In this manner, the flexible element 260 would be doubled over in different amounts, corresponding to the portion opened. For example, should the flexible element 260 be doubled over in its entirety in the open position, it may only be doubled over 50% when the two elements are in a halfway open position. These proportions of doubling are merely an example of how the system may function, and any direct proportion of doubling over, or layering beyond doubling over, may be present in other embodiments, as well as relationships that are not direct proportions. Likewise, in various embodiments the positions may correspond to a start and end position rather than an open or closed position, and any position between the start and end positions of the movement are a possible state. In all cases, tension is present on the flexible element 260 during movement and when the device is static.

In various embodiments, selection of the tensioning element's 270 specific parameters may be important to proper functioning of the system. In the example where the tensioning element 270 is a spring, the specific spring constant of the spring may be important for proper tensioning of the flexible element 260. A spring constant that is too high could damage the flexible element 260, and a spring constant that is too low could lack the necessary force to maintain tension on the contact point 280. This concept of selection can also be applied to other tensioning elements. Various approaches for selecting an appropriate set of parameters or qualities for 270 will be apparent.

Figure 3A:
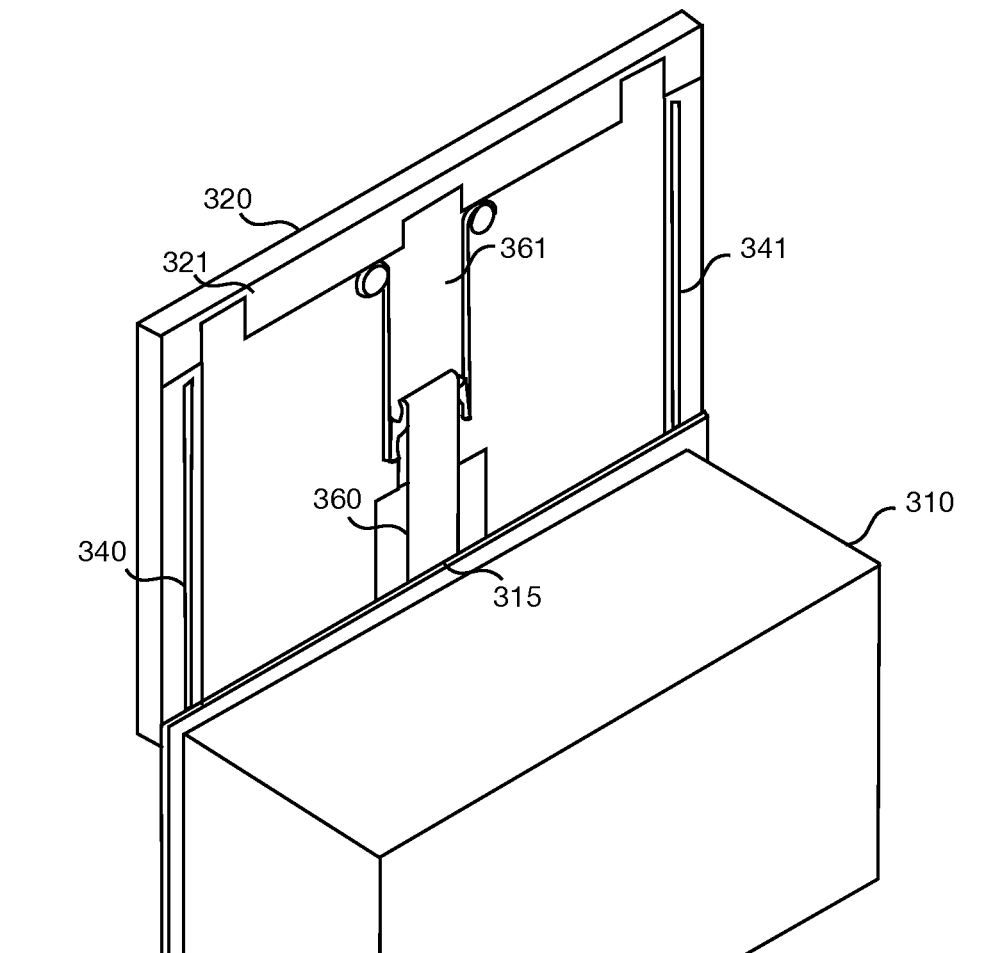
FIG. 3A illustrates a rear isometric view of a controller with a slidable screen in implementing a ribbon cable management system in accordance with various embodiments.

FIG. 3A illustrates a rear isometric view of a controller, 300, with a slidable screen implementing a ribbon cable management system in accordance with various embodiments. A screen 320 is movable relative to a controller housing 310. The controller housing 320 may contain a GPU or processor, and a ribbon cable 360 may communicate information from the GPU or processor to the screen 320. The ribbon cable 360 may connect to the controller housing at a controller connection point 315. The controller connection point 315 may a true connection point, or may be a controller housing cable clamp, where the ribbon cable 360 is clamped, and where the ribbon cable 360 further extends into the controller housing 310 to a true connection point. In this way, the tension on the ribbon cable 360 is maintained between the screen 320 and the controller housing 310, but there is no tension on the true connection spot of the ribbon cable 360 to the controller housing 310. In turn, the connection of ribbon cable 360 will not be jeopardized by tensioning and the true connection spot will have greater longevity and be less susceptible to damage. The controller housing 310 may be mounted within a wall, leaving the screen 320 exposed and slidable on the face of the wall. The screen 320 may be slidable on a set of rails 340, 341, or may be slidable on a number of alternative mechanisms. The screen 320 may also be slidable in a number of other directions, such a left, right, or downward relative to the controller housing 310. A frame 321 may be mounted to the back of the screen 320, or the frame 321 may be one integrated element with the screen 320. The frame 321 may have a cable channel 361, in which the ribbon cable 360 can travel or otherwise be disposed. While in this embodiment, the cable channel 361 is open and the ribbon cable 360 is exposed, in other embodiments the cable channel 361 is closed and the ribbon cable 360 is at least partially closed. In other embodiments, the ribbon cable 360 may not travel in a channel, and may reside between the screen 320 and the controller housing 310, not flush with either the screen or the controller housing.

Figure 3B:
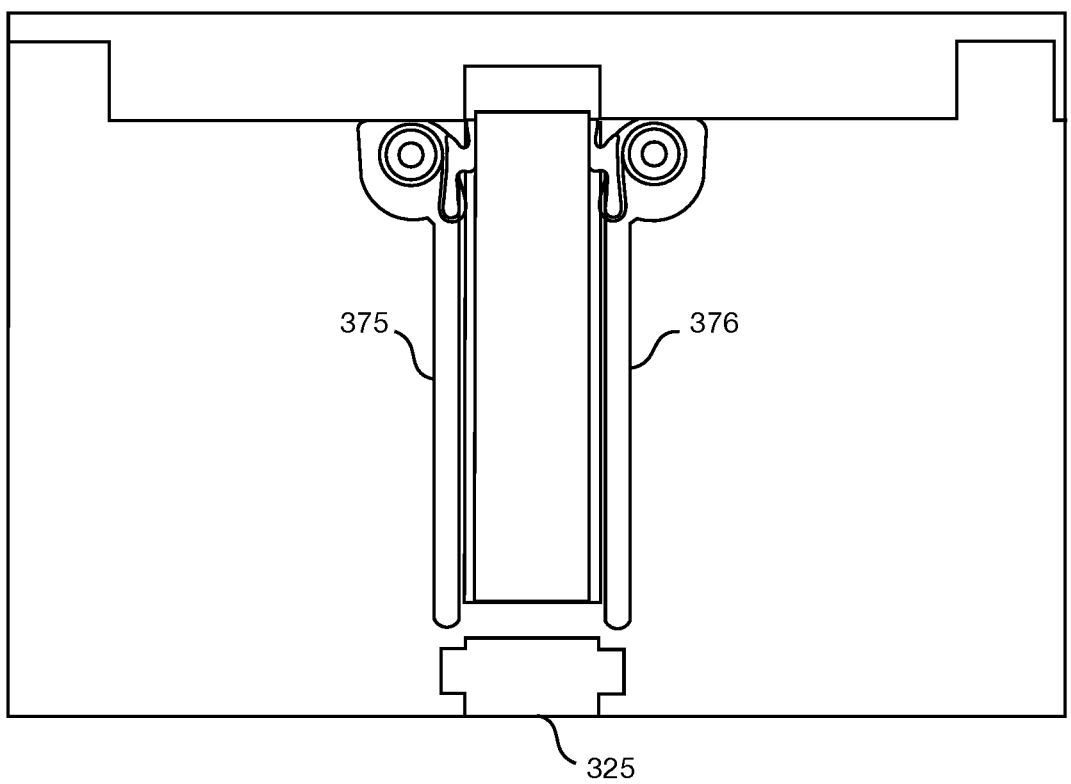
FIG. 3B illustrates a rear view of a slidable screen implementing a ribbon cable management system in accordance with various embodiments.

FIG. 3B illustrates a rear view of a slidable screen implementing a ribbon cable management system in accordance with various embodiments. FIGS. 2A and 2B illustrate a tensioning element 270 that is in-line with the contact point 280, illustrated as a crossbar. That is, the tensioning element 270 moves on a single axis with the contact point 280. The embodiment in FIGS. 3A, 3B, and 3C, however, illustrates how the tensioning elements 370, 371 may be offset relative to the contact points 380, 381. Such an embodiment also demonstrates how contact points 380, 381, may both function to move a crossbar or other component which the flexible element 360 contacts. In turn, this configuration provides for better component orientation and a lower profile. Numerous other advantages will also be apparent in such a configuration.

Figure 3C:
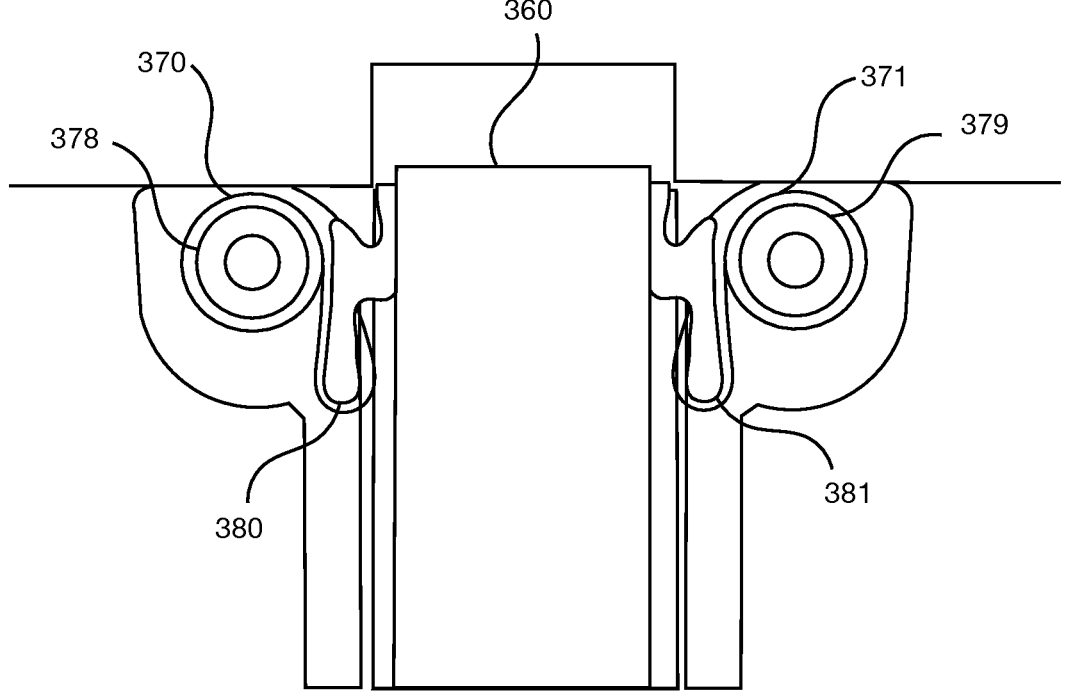
FIG. 3C illustrates a magnified portion of the slidable screen and ribbon cable management system of FIG. 3B.

In a similar manner as the controller connection point 315, the system may include a screen connection point 325. The screen connection point 325 may be a true connection point, or may be a screen cable clamp, where the ribbon cable 360 is clamped, and where the ribbon cable 360 further extends into the screen 320 to a true connection point. Such a configuration offers the same benefits of longevity as the controller housing cable clamp in the controller connection point 315. The view in FIG. 3B illustrates tensioning channels 375, 376 that may be present in various embodiments. Referring also to FIG. 3C, which illustrates a magnified portion of the slidable screen and ribbon cable management system of FIG. 3B, the tensioning elements 370, 371, depicted as constant force springs in this embodiment, but could be a number of various springs, elastic bands, or other means for applying a tension, may run through the tensioning channels 375, 376. The tensioning elements 370, 371 may connect to contact points 380, 381, represented in FIG. 3C as a crossbar, in which the ribbon cable 360 wraps around. The contact points 380, 381 may be a direct connection or a number of other mediums through which a force may be imparted on the ribbon cable 360 by the tensioning elements 370, 371. Furthermore, FIG. 3C illustrates two contact points 380, 381, but in various embodiments, a single contact point 380 may exist or more than two contact points may exist. The tensioning elements 370, 371, depicted as constant force springs in this embodiment, may be fixed at tensioning hubs 378, 379, depicted as plastic spools in this embodiment. In an example embodiment, the use of plastic spools would allow for the rotation of the constant force springs with little additional resistance and would alleviate potential problems with winding and unwinding during movement of the constant force springs within tensioning channels 375, 376. The use of constant force springs and plastic spools may be substituted for a number of known alternatives, such as coil springs and fastening pins, gas springs and a screw anchor, elastic bands and hooks, etc. Furthermore, the arrangement of the tensioning elements 370, 371 may be in the opposite direction. For example, coil springs may be used that exert a restoring force on the contact points 380, 381 when in a compressed, rather than tensed, state. In turn, the spring would 'push' rather than 'pull' to exert a tension on the contact points 380, 381. Various embodiments may not possess tensioning channels 375, 376, where the tensioning elements 370, 371 impart a force on the connection point 380 in an area between the screen 320 and the controller housing 310. Various embodiments may only possess one tensioning channel 375, one tensioning element 370, or numerous tensioning channels and numerous tensioning elements.

Figure 4:
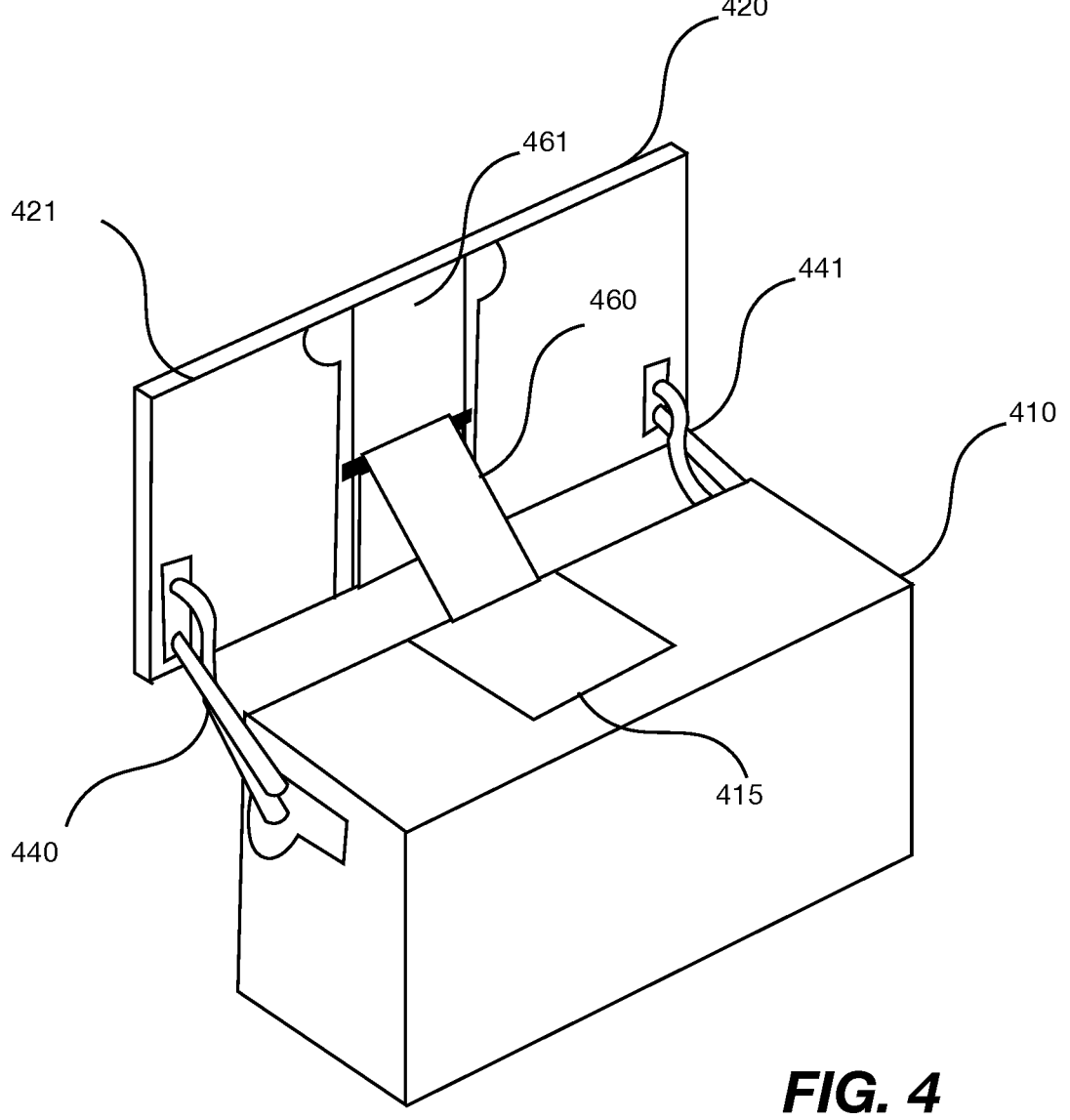
FIG. 4 illustrates a rear isometric view of a first alternative controller with a hingedly connected screen implementing a ribbon cable management system in accordance with various embodiments.

FIG. 4 illustrates a rear isometric view of a first alternative controller with a hingedly connected screen implementing a ribbon cable management system in accordance with various embodiments. A screen 420 is movable relative to a controller housing 410 via a first hinge 440 and a second hinge 441. The controller housing 410 and screen 420 are merely example components, and these components may be any two different elements. The controller housing 420 may contain a GPU or processor, and a ribbon cable 460 may communicate information from the GPU or processor to the screen 420. The ribbon cable 460 may be a number of alternative cable types, depending on the hardware within the controller housing 410 and the necessary inputs or connection associated with the screen 420. The ribbon cable 460 may connect to the controller housing at a controller connection point 415. The controller connection point 415 may be a controller housing cable clamp, where the ribbon cable 460 is clamped, and where the ribbon cable 460 further extends into the controller housing 410 to a true connection point. Such a configuration offers the same benefits of longevity as the controller housing cable clamp in the controller connection point 315. The controller housing 410 may be mounted within a wall, leaving the screen 420 exposed and able to be hingedly opened from the face of the wall. The screen 420 may be hingedly opened on a set of hinges 440, 441, or may be hingedly opened on a number of mechanisms with more or less hinges, alternative arrangements of hinges, or mechanisms which produce a hinge-like movement, including gas strut mechanisms or other similar mechanisms. In various embodiments, the hinges may be positioned such that the screen 420 hinges open to the left, right, or below the controller housing 410. Additionally, the screen 420 is depicted as residing in a plane parallel to the anterior face of the controller housing 410, but may be perpendicular to the controller housing 410 or angled in any direction in accordance with various embodiments.

A frame 421 may be mounted to the back of the screen 420, or the frame 421 may be one integrated element with the screen 420. The frame 421 may have a cable channel 461, in which the ribbon cable 460 can travel. In various embodiments, the ribbon cable 460 may not travel in a channel, and may reside between the screen 420 and the controller housing 410, neither flush with the screen nor the controller housing.

Referring back to FIGS. 3B and 3C, various embodiments with a hinge mechanism may utilize the tensioning elements 370, 371 in a similar manner to that of embodiments with a sliding screen. The tensioning elements 370, 371 may run through the tensioning channels 375, 376. The tensioning elements 370, 371 may connect to contact points 380, 381, represented in FIG. 3C as a crossbar in which the ribbon cable 360 wraps around. The contact points 380, 381 may be a number of other mediums through which a force may be imparted on the ribbon cable 360 by the tensioning elements 370, 371. The tensioning elements 370, 371 may be fixed at tensioning hubs 378, 379. The use of constant force springs and plastic spools may be substituted for a number of known alternatives, such as coil springs and fastening pins, elastic bands and hooks, etc. Furthermore, the arrangement of the tensioning elements 370, 371 may be in the opposite direction. Various embodiments may not possess tensioning channels 375, 376, where instead the tensioning elements 370, 371 impart a force on the connection point 380 in an area between the screen 320 and the controller housing 310. Various embodiments may only possess one tensioning channel 375, one tensioning element 370, or numerous tensioning channels and numerous tensioning elements.

The tensioning elements 370, 371, as well as the contact points 380, 381, may be contained via a reinforced plate (not shown) in an embodiment utilizing hinges 440, 441. In this manner, the force of the ribbon cable 460 in the direction perpendicular to the force exerted by the tensioning elements 370, 371 (and thus the path of the the cable channel 461 as well) would not cause displacement of the contact points 380, 381 out of the cable channel 461. A similar reinforcement mechanism may be utilized for a detachable screen that is connected via one or more cord reels to a controller housing in various embodiments.

Figure 5:
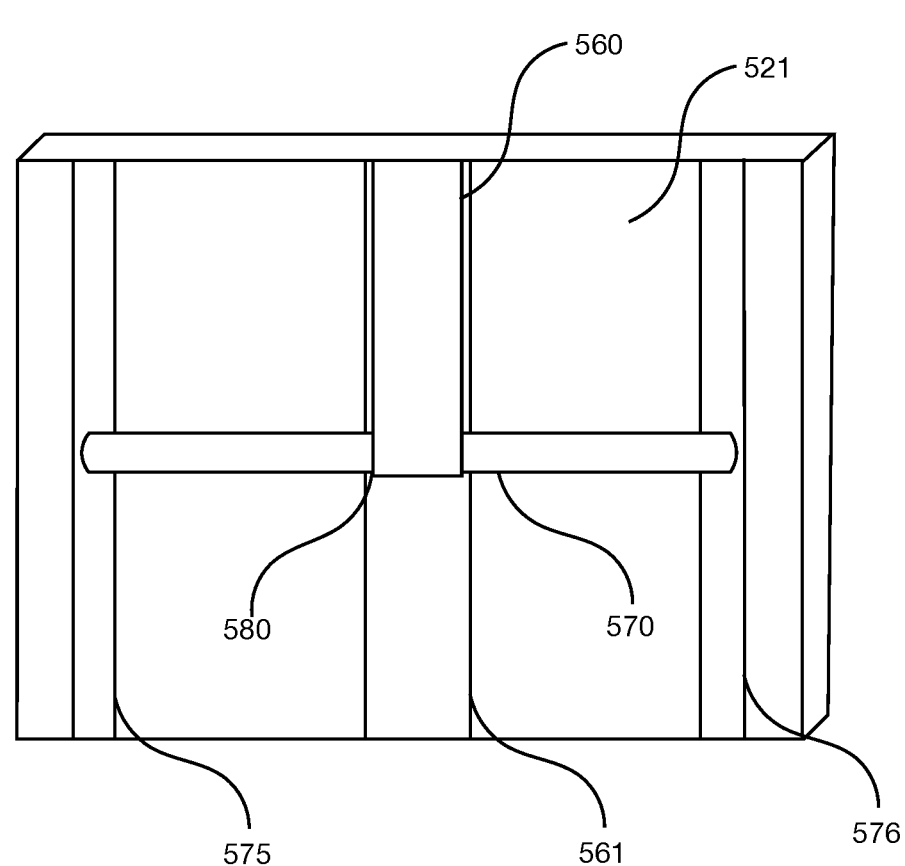
FIG. 5 illustrates a rear view of a second alternative controller having a downward slidable screen implementing an alternative ribbon cable management system in accordance with various embodiments.

FIG. 5 illustrates a rear view of a second alternative controller having a downward moveable screen implementing an alternative ribbon cable management system in accordance with various embodiments. A screen 520 is movable relative to another element. The screen 520 is an example component, and could be a number of other components. The other element may contain a GPU, processor, or other electrical connection, and a ribbon cable 560 may communicate information from the GPU, processor, or other components to the screen 520. The ribbon cable 560 may be a number of alternative cable types, depending on the hardware within the other element and the necessary inputs or connection associated with the screen 520. The screen 520 may be slidable on a set of rails (not shown), slidable on a number of similar mechanisms, hingedly connected. A frame 521 may be mounted to the back of the screen 520, or the frame 521 may be one integrated element with the screen 520. The frame 521 may have a cable channel 561, in which the ribbon cable 560 can travel. In other embodiments, the ribbon cable 560 may not travel in a channel, and may reside between the screen 520 and another element, not flush with either the screen or the other element.

Within the frame 521, there may be tensioning channels 575, 576 along which a tensioning element 570 travels. The tensioning element 570 in the present embodiment is depicted as a weighted tensioning bar of nearly screen width, but could be of various shapes and dimensions. The ribbon cable 560 may wrap around the tensioning element 570 at a contact point 580. In the present embodiment, the contact point 580 is part of the tensioning element 570 itself, but in various embodiments, may be a medium through which the tensioning element 570 acts. Furthermore, the present embodiment depicts a single tensioning element 570 with a single contact point 580, but various embodiments may incorporate multiple tensioning elements and contact points. The ribbon cable 560 travels along a cable channel 561. Additionally, various embodiments may not possess tensioning channels 575, 576, where the tensioning element 570 imparts a force on the connection point 580 in an area between the screen 520 and a second element. Various embodiments may only possess one tensioning channel 575, or numerous tensioning channels. Furthermore, the present embodiments only depicts a single tensioning element 570, but numerous tensioning elements may be used in conjunction. The ribbon cable 560 travels along a cable channel 561. As the screen 520 slides relative to the other element, the tensioning element 570 slides in the opposite direction while maintaining a tension on the flexible element 560.

As depicted in this example, the flexible element 560 is doubled over for a length appropriate for there to be little to no slack. The position in FIG. 5 is non-exhaustive, as the screen 520 may be in any position between a fully open position and a fully closed position. In this manner, the flexible element 560 would be doubled over in different amounts, corresponding to the portion opened. These proportions of doubling are merely an example of how the system may function, and any direct proportion of doubling over, or even layering beyond doubling over, may be present in other embodiments. Furthermore, embodiments may use more than one tensioning element 570, creating more layering in different proportions. In various embodiments, the selection of the weight for the weighted tension rod, acting as the tensioning element 570, may be important for proper tensioning of the flexible element 560. A weight that is too heavy could damage the flexible element 560, and a weight that is too light could lack the necessary force to maintain tension on the connection point 580. This concept of selection can also be applied to other tensioning elements.

One skilled in the art will see that the invention can be incorporated in numerous embodiments, including, but not limited to, those that involve movement of a cable along a radial path. In such an example embodiment, a curved screen is be slidable relative to a semicircle controller housing. Information is relayed between the semicircle controller housing and the curved screen via a ribbon cable which resides in a cable channel integrated into a frame mounted to the back of the curved screen. The ribbon cable, being a flexible element, is guided by a series of frictionless rolling pins that are housed between the curved screen and the semicircle controller housing. In this way, the ribbon cable connects to the controller perpendicularly at a fixed point, while the remainder of the ribbon cable follows the radial contour of the curved screen and the semicircle controller housing. The cable length is dependent upon the position of a contact point, connecting the ribbon cable with the tensioning element. The tensioning element may be a constant force spring, which is movable within a tension channel, or numerous alternative mechanisms such as elastic bands. The position of the contact point determines the length of the ribbon cable that is overlapping itself, and, similar to other embodiments described herein, may be a direct proportion or other relationship that is not a direct proportion.

It should be apparent from the foregoing description that various example embodiments of the invention may be implemented in hardware. Although the various exemplary embodiments have been described in detail with particular reference to certain example aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the scope of the claims.

The invention claimed is:

1. A flexible element management apparatus comprising: a first element; a second element, wherein the second element is movable relative to the first element; a flexible element extending between the first element and the second element; and a tensioning element comprising a constant-force spring in contact with the flexible element and configured to maintain substantially constant tension on the flexible element over movement of the second element relative to the first element; whereby movement of the second element relative to the first element results in movement of at least one endpoint of the flexible element, wherein the first element comprises a display screen and wherein the second element comprises components that enable functioning of the display screen, wherein the constant-force spring is housed within the first element.

2. The apparatus of claim 1, wherein tension is maintained on the flexible element during movement.

3. The apparatus of claim 1, wherein the constant-force spring comprises-a flat-band spring wound on a spool.

4. The apparatus of claim 1, wherein the flexible element provides an electrical connection between the first element and the second element.

5. The apparatus of claim 4, wherein the flexible element communicates information via the electrical connection between the first element and the second element.

6. The apparatus of claim 1, wherein the second element is slidable relative to the first element.

7. The apparatus of claim 1, wherein the second element is slidable relative to the first element in a plane parallel to a planar face of the second element.

8. A computer cable management apparatus comprising: a first element; a second element, wherein the second element is movable relative to the first element; a computer cable extending between the first element and the second element; and a tensioning element comprising a constant force spring in contact with the computer cable and configured to maintain substantially constant tension on the computer cable over movement of the second element relative to the first element; whereby: movement of the second element relative to the first element results in movement of at least one endpoint of the computer cable, wherein the first element comprises a display screen and wherein the second element comprises components that enable functioning of the display screen, wherein the constant-force spring is housed within the first element.

9. The apparatus of claim 8, wherein the computer cable is a ribbon cable.

10. The apparatus of claim 8, wherein the second element is slidable relative to the first element.

11. A computer cable management apparatus comprising: a first element; a second element, wherein the second element is movable relative to the first element; a computer cable extending between the first element and the second element; a tensioning element comprising a constant-force spring; and a contact point between the tensioning element and the computer cable; whereby: movement of the second element relative to the first element results in movement of at least one endpoint of the computer cable, and tension is maintained on the computer cable, wherein the first element comprises a display screen and wherein the second element comprises components that enable functioning of the display screen, wherein the constant-force spring is housed within the first element.

12. The apparatus of claim 11, wherein substantially constant tension is maintained on the computer cable during movement of the second element relative to the first element.

13. The apparatus of claim 11, wherein the computer cable is a ribbon cable.

14. The apparatus of claim 11, wherein the second element is slidable relative to the first element.

15. The apparatus of claim 11, further comprising a second tensioning element.

16. The apparatus of claim 11, further comprising a second contact point between the tensioning element and the computer cable.

* * * * *